US010853580B1

(12) United States Patent
Amrite et al.

(10) Patent No.: US 10,853,580 B1
(45) Date of Patent: Dec. 1, 2020

(54) GENERATION OF TEXT CLASSIFIER TRAINING DATA

(71) Applicant: SparkCognition, Inc., Austin, TX (US)

(72) Inventors: Jaidev Amrite, Austin, TX (US); Erik Skiles, Manor, TX (US); William McNeill, Austin, TX (US)

(73) Assignee: SPARKCOGNITION, INC., Austin, TX (US)

( * ) Notice: Subject to any disclaimer, the term of this patent is extended or adjusted under 35 U.S.C. 154(b) by 0 days.

(21) Appl. No.: 16/669,123

(22) Filed: Oct. 30, 2019

(51) Int. Cl.
*G06F 40/30* (2020.01)
*G06N 3/04* (2006.01)
*G06N 3/08* (2006.01)
*G06F 3/0481* (2013.01)
*G06F 3/0484* (2013.01)

(52) U.S. Cl.
CPC .......... *G06F 40/30* (2020.01); *G06N 3/0445* (2013.01); *G06N 3/08* (2013.01); *G06F 3/0481* (2013.01); *G06F 3/0484* (2013.01)

(58) Field of Classification Search
CPC .............................. G06F 40/216; G06F 40/30
See application file for complete search history.

(56) References Cited

U.S. PATENT DOCUMENTS

| | | | | |
|---|---|---|---|---|
| 2005/0027664 | A1* | 2/2005 | Johnson | G06F 40/45 706/12 |
| 2009/0281970 | A1* | 11/2009 | Mika | G06F 40/169 706/12 |
| 2009/0282012 | A1* | 11/2009 | Konig | G06F 40/295 |
| 2010/0076923 | A1* | 3/2010 | Hua | G06F 16/70 706/61 |
| 2010/0235165 | A1* | 9/2010 | Todhunter | G06F 16/3329 704/9 |
| 2013/0159277 | A1* | 6/2013 | Liu | G06F 40/295 707/709 |

(Continued)

OTHER PUBLICATIONS

Huang, Eric H., et al. "Improving word representations via global context and multiple word prototypes." Proceedings of the 50th Annual Meeting of the Association for Computational Linguistics: Long Papers—vol. 1. Association for Computational Linguistics, 2012. (Year: 2012).*

(Continued)

*Primary Examiner* — Jialong He
(74) *Attorney, Agent, or Firm* — Moore IP Law

(57) ABSTRACT

A method includes receiving input designating a term of interest in a document of a document corpus and determining a target context embedding representing a target word group that includes the term of interest and context words located in the document proximate to the term of interest. The method also includes identifying, from among the document corpus, a first candidate word group that is semantically similar to the target word group and a second candidate word group that is semantically dissimilar to the target word group. The method further includes receiving user input identifying at least a portion of the first candidate word group as associated with a first label and identifying at least a portion of the second candidate word group as not associated with the first label. The method also includes generating labeled training data based on the user input to train a text classifier.

26 Claims, 5 Drawing Sheets

(56) References Cited

U.S. PATENT DOCUMENTS

| | | | |
|---|---|---|---|
| 2015/0378986 A1* | 12/2015 | Amin | H04L 51/12 |
| | | | 704/9 |
| 2016/0350288 A1* | 12/2016 | Wick | G06F 40/242 |
| 2017/0011289 A1* | 1/2017 | Gao | G06F 40/268 |
| 2017/0034107 A1* | 2/2017 | Krishnaswamy | H04L 51/32 |
| 2017/0083484 A1* | 3/2017 | Patil | G06F 40/211 |
| 2018/0225280 A1* | 8/2018 | Dugan | G06N 20/00 |

OTHER PUBLICATIONS

Melamud, Oren, Jacob Goldberger, and Ido Dagan. "context2vec: Learning generic context embedding with bidirectional lstm." Proceedings of the 20th SIGNLL Conference on Computational Natural Language Learning. 2016. (Year: 2016).*

* cited by examiner

GENERATION OF TEXT CLASSIFIER TRAINING DATA

BACKGROUND

A text classifier is a data model that is used to evaluate text and assign labels to the text to associate the text with one or more categories. For example, a text classifier can be used to sort documents (or another text sample) into subject matter categories, such as "biography," "mystery," "geology," "religion," and so forth.

It is common for a text classifier to be domain-specific. For example, a first text classifier may be custom built for a first data set that is related to particular subject matter or that is owned or curated by a particular entity, and a second text classifier may be custom built for a second data set that is related to different subject matter or that is owned or curated by a different entity. The custom nature of such text classifiers is due, for example, to the different interests and emphases of the entities that use the text classifiers or data sets, due to intrinsic differences in the data sets, or both.

Text classifiers are generally trained using supervised machine learning techniques and labeled training data. For a custom-built text classifier, it can be challenging to generate suitable labeled training data. For example, text classifiers are generally more reliable if they are trained using a suitably representative set of labeled samples. Reliability can also be improved by providing both positive and negative samples for some labels. In this context, a positive sample is a sample that should be associated with a particular label and a negative sample is a sample that should not be associated with the particular label.

It can be difficult for someone who is not familiar with both the data set and the goals of the entity using the text classifier to properly label data samples. A subject matter expert who is both familiar with the data set and the entity's goals can be used to label text samples to generate the labeled training data; however, such subject matter experts are often senior, highly skilled employees or outside experts whose time is expensive to use for such tasks as reading text and assigning labels or searching the data set for representative samples of text.

SUMMARY

Particular implementations of systems and methods to simplify generating training data for text classifiers are described herein. A particular system simplifies generation of labeled training data by assisting a user with identifying other text samples that are similar to a labeled text sample in order to label positive samples, negative samples, or both.

In a particular aspect, a system for generating a text classifier for a document corpus includes one or more processors and one or more memory devices coupled to the one or more processors. The one or more memory devices store instructions that are executable by the one or more processors to perform operations including receiving input designating a term of interest in a document of the document corpus. The operations also include determining a target term embedding representing the term of interest and determining whether the document corpus includes one or more terms that are semantically similar to the term of interest based on distances between the target term embedding and term embeddings representing terms from the document corpus. The operations further include determining a target context embedding representing a target word group. The target word group includes the term of interest and context words located in the document proximate to the term of interest. The operations also include identifying, from among the document corpus, a first candidate word group that is semantically similar to the target word group based on a distance between the target context embedding and a context embedding of the first candidate word group. The operations further include identifying, from among word groups of the document corpus that include the term of interest or a semantically similar term, a second candidate word group that is semantically dissimilar to the target word group based on a distance between the target context embedding and a context embedding of the second candidate word group. The operations include presenting, via a user interface, output including the first candidate word group and the second candidate word group and receiving user input via the user interface. The user input identifies at least a portion of the first candidate word group as associated with a first label and identifies at least a portion of the second candidate word group as not associated with the first label. The operations also include generating labeled training data based on the user input to train the text classifier.

In another particular aspect, a method of generating a text classifier for a document corpus includes receiving, at a computing device, input designating a term of interest in a document of the document corpus and determining a target term embedding representing the term of interest. The method also includes determining whether the document corpus includes one or more terms that are semantically similar to the term of interest based on distances between the target term embedding and term embeddings representing terms from the document corpus. The method further includes determining a target context embedding representing a target word group. The target word group includes the term of interest and context words located in the document proximate to the term of interest. The method also includes identifying, from among the document corpus, a first candidate word group that is semantically similar to the target word group based on a distance between the target context embedding and a context embedding of the first candidate word group. The method further includes identifying, from among word groups of the document corpus that include the term of interest or a semantically similar term, a second candidate word group that is semantically dissimilar to the target word group based on a distance between the target context embedding and a context embedding of the second candidate word group. The method includes presenting, via a user interface, output including the first candidate word group and the second candidate word group and receiving user input via the user interface. The user input identifies at least a portion of the first candidate word group as associated with a first label and identifies at least a portion of the second candidate word group as not associated with the first label. The method also includes generating labeled training data based on the user input to train the text classifier.

In another particular aspect, a computer-readable storage device stores instructions that are executable by a processor to perform operations including receiving input designating a term of interest in a document of a document corpus and determining a target term embedding representing the term of interest. The operations also include determining whether the document corpus includes one or more terms that are semantically similar to the term of interest based on distances between the target term embedding and term embeddings representing terms from the document corpus. The operations further include determining a target context embedding representing a target word group. The target word group includes the term of interest and context words located in the document proximate to the term of interest. The operations also include identifying, from among the document corpus, a first candidate word group that is semantically similar to the target word group based on a distance between the target context embedding and a context embedding of the first candidate word group. The operations further include identifying, from among word groups of the document corpus that include the term of interest or a semantically similar term, a second candidate word group that is semantically dissimilar to the target word group based on a distance between the target context embedding and a context embedding of the second candidate word group. The operations include presenting, via a user interface, output including the first candidate word group and the second candidate word group and receiving user input via the user interface. The user input identifies at least a portion of the first candidate word group as associated with a first label and identifies at least a portion of the second candidate word group as not associated with the first label. The operations further include generating labeled training data based on the user input to train a text classifier.

DETAILED DESCRIPTION

Figure 1:
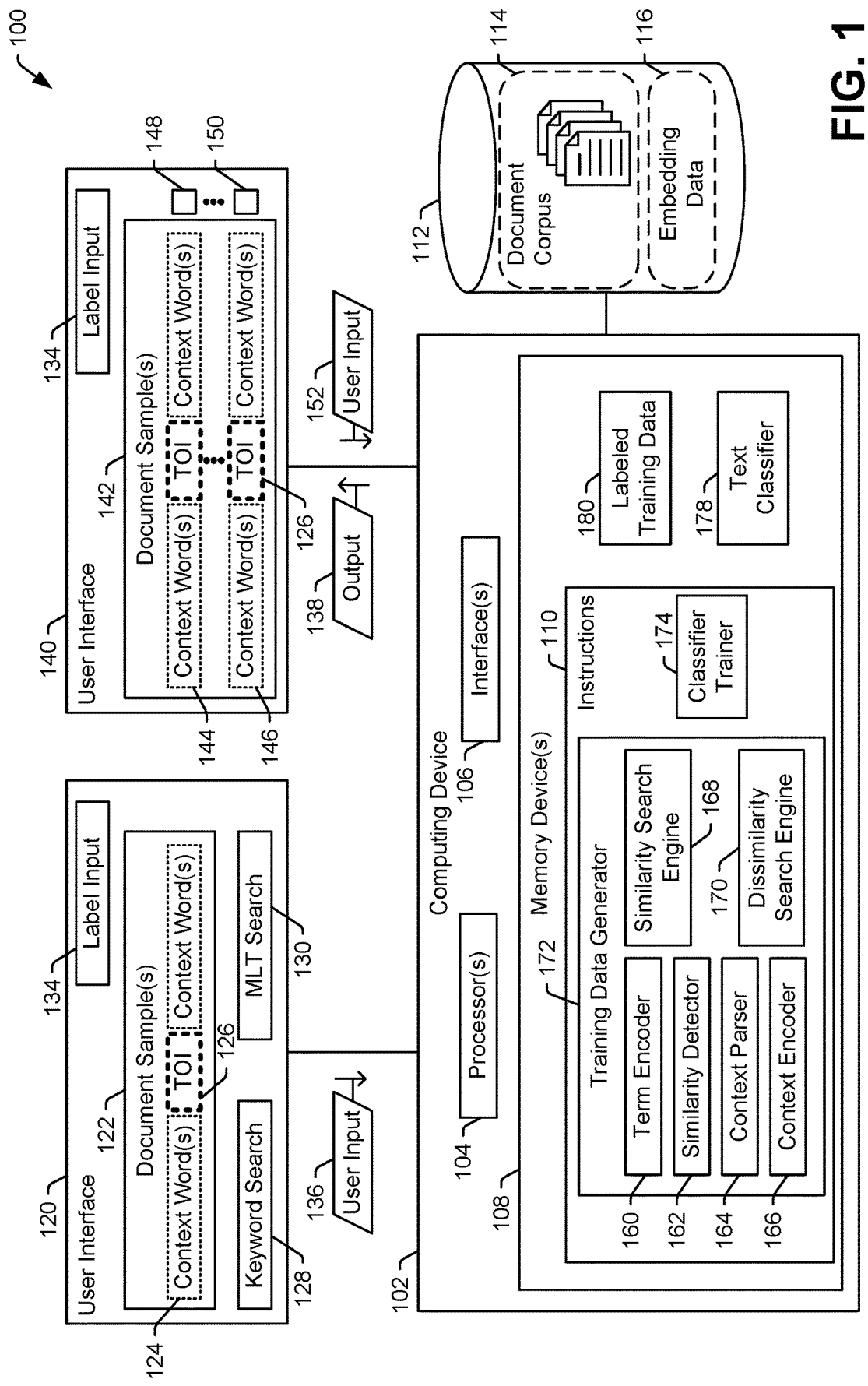
FIG. 1 illustrates a particular example of a system that is operable to generate labeled training data to train a text classifier.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

As used herein, "term" refers to one or more words (e.g., a single word, a phrase, a clause, etc.), one or more abbreviations (e.g., a shortened word, an acronym, an initialism, a contraction, etc.), or a combination thereof. Further, as used herein, "semantic similarity" refers to how similar or related two or more terms are. For example, semantic similarity can be determined or measured based on a distance between two terms in an embedding space. "Semantic dissimilarity" refers to how dissimilar two or more terms are and can be determined or measured based on a distance between the two or more terms in the embedding space.

FIG. 1 illustrates a particular example of a system 100 that is operable to generate labeled training data 180 to train a text classifier 178. The system 100 includes a computing device 102 including one or more processors 104 and one or more memory devices 108 coupled to the processor(s) 104. The computing device 102 also includes one or more interfaces devices 106 to enable the computing device 102 to communicate with input/output devices, other computing devices, etc. The memory device(s) 108 store instructions 110 that are executable by the processor(s) 104 to perform operations, described below, to generate the labeled training data 180 based on a document corpus 114.

In the following description, the instructions 110 are described as including various functional instruction sets including: a training data generator 172 and a classifier trainer 174. This division of the instructions 110 into the described functional instruction sets is merely for the sake of convenience to facilitate description of the various operations performed by the instructions 110 and is not limiting. In some implementations, the instructions 110 include fewer functional instruction sets than described with reference to FIG. 1. For example, the training data generator 172 and the classifier trainer 174 can be combined in a single functional instruction set, such as a text classification application. In other implementations, the instructions 110 include more functional instruction sets than described with reference to FIG. 1. For example, the instructions 110 can include a pre-processing instruction set that facilitates intake of documents of the document corpus 114 before execution of the training data generator 172.

Additionally, the training data generator 172 is described in terms of various functional instruction sets including: a term encoder 160, a similarity detector 162, a context parser 164, a context encoder 166, a similarity search engine 168, and a dissimilarity search engine 170. This division of the training data generator 172 into the described functional instruction sets is merely for the sake of convenience to facilitate description of the various operations performed by the training data generator 172 and is not limiting. In some implementations, the training data generator 172 includes fewer functional instruction sets than described with reference to FIG. 1. For example, the similarity search engine 168 and the dissimilarity search engine 170 can be combined in a single search engine. In other implementations, the training data generator 172 includes more functional instruction sets than described with reference to FIG. 1.

FIG. 1 also illustrates multiple user interfaces, including a first user interface 120 and a second user interface 140, that can be presented (e.g., via a display device) to a user responsive to execution of the instructions 110. The user interfaces 120, 140 enable the user to provide user input (e.g., user input 136 and user input 152) to direct or influence the operations performed during execution of the instructions 110. In some implementations, the instructions 110 can also generate other user interfaces, receive other user input, receive input from other sources (e.g., other computers systems), or generate output.

In FIG. 1, the user interfaces 120 and 140 are examples of a user interface to provide information to assist the user with assigning labels to documents of the document corpus 114. The first user interface 120 depicts a document sample 122 and various selectable display elements to direct search and document labeling functions, such as a label input selectable item 134, a keyword search selectable item 128, and a "more like this" (MLT) search selectable item 130, each of which is described below. In other implementations, the first user interface 120 can include more, fewer, or different features or display elements. Selectable display elements of the user interfaces 120, 140, such as the selectable items 128, 130, and 134, can include buttons, pulldown menus, checkboxes, or other input or navigation control elements.

The document sample 122 corresponds to a document or a portion of a document of the document corpus 114 displayed to the user to enable the user to assign at least one label to the document (or to the document sample 122). For text classification, it is generally desirable for the user to review enough of a document to understand the context in which particular terms are used. Thus, in FIG. 1, the document sample 122 includes a term of interest (TOI) 126 and context words 124 that appear near the TOI 126 in the document. The TOI 126 can include a single word or a set of words. In the context of FIG. 1, the TOI 126 is of interest to the user as potentially associated with a label (e.g., a category label) to be used by the text classifier 178. The specific content of the TOI 126 may depend on the document corpus 114, the goals or intent of the user, and possibly other factors. As a specific example, if the user is a music historian and the document corpus 114 includes news articles that are being evaluated for content related to historically significant musical groups, the TOI 126 can include the name of a band or music venue.

To illustrate, the term "Queen" as a term of interest could refer to a monarch or to a band. This example highlights a situation that can lead to ineffective text classifiers—specifically, one term can have different meanings (semantic content) depending on context. The keyword search selectable item 128 enables the user to search the document corpus 114 for the word Queen; however, it is possible (depending on the content of the document corpus 114) that the search results returned will be mixed, including some references to monarchs and some references to the band Queen. To avoid or reduce mislabeling, the user would need to read the content (e.g., the context words 124) associated with the keyword to decide whether or how each search result should be labeled.

To simplify this process, the first user interface 120 includes the MLT search selectable item 130 to enable the user to perform a MLT search. To perform a MLT search, the user provides input (e.g., the user input 136) designating the TOI 126 in the document sample 122 and selects the MLT search selectable item 130. In some implementations, the user also, or in the alternative, assigns the TOI 126 to a text classification category (i.e., assigns a label to the TOI 126) before or along with initiating the MLT search.

In response to the user input 136, the instructions 110 are executable by the processor(s) 104 to identify a target word group including the TOI 126 and the context words located proximate to the TOI 126 in the document sample 122. The instructions 110 cause the processor(s) 104 to use the target word group to search the document corpus 114 for semantically similar word groups. A semantically similar word group is a group of words that is near (e.g., within a threshold distance) the target word group in a context embedding space. In some implementations, the instructions 110 also cause the processor(s) 104 to use the target word group to search the document corpus 114 for semantically dissimilar word groups. A semantically dissimilar word group is a group of words that includes the TOI 126 and is distant from (e.g., greater than a threshold distance from) the target word group in the context embedding space. In some implementations, a semantically similar word group, a semantically dissimilar word group, or both, can include a term that is semantically similar to the TOI 126 rather than including the TOI 126. For example, before searching for semantically similar word groups or semantically dissimilar word groups, the instructions 110 may cause the processor(s) 104 to search for terms that are semantically similar to the TOI 126 (e.g., within a threshold distance of the TOI 126 in a term embedding space) and to use the context words 124 and the terms that are semantically similar to the TOI 126 to generate additional target word groups that are used to search for semantically similar or semantically dissimilar word groups.

The instructions 110 are executable by the processor(s) 104 to generate output 138 to identify the semantically similar word groups, the semantically dissimilar word groups, or both. For example, the output 138 includes or is used to generate the second user interface 140, which includes one or more document samples 142. The document sample(s) 142 include portions of documents of the document corpus 114 that include the semantically similar word groups, the semantically dissimilar word groups, or both. To illustrate, a first document sample 144 may include a semantically similar word group, and a second document sample 146 may include a semantically dissimilar word group. Although two document samples 144 and 146 are illustrated in FIG. 1, the MLT search results can identify more than two word groups, and the second user interface 140 can include more than two document samples 142 corresponding to the MLT search results.

The user can assign one or more of the document samples 142 to a respective text classification category via the second user interface 140. To illustrate, in FIG. 1, the user can select a check box 148 associated with the first document sample 144 and select a label input selectable item 134 to indicate that the first document sample 144 is associated with a particular text classification category represented by a particular label. In other implementations, the second user interface 140 can include other selectable control elements (e.g., a check box 150) to receive user input (e.g., the user input 152) assigning one or more of the document samples 142 to a respective text classification category.

In a particular implementation, the second user interface 140 enables the user to designate both positive and negative examples of particular text classification categories based on the MLT search. For example, the second user interface 140 includes at least some of the MLT search results and visually distinguishes the TOI 126 or terms semantically similar to the TOI 126 in the document samples 142. The user can therefore see what term in each document sample 142 caused the document sample 142 to be listed in the MLT search results. As explained above, the MLT search results can list one or more dissimilar word groups, which correspond to one or more of the document samples 142, such as the second document sample 146. The dissimilar word groups are identified in the MLT search results to improve the text classifier's ability to distinguish uses of the TOI 126 (or semantically similar terms) that are associated with the text classification category from uses of the TOI 126 (or semantically similar terms) that are not associated with the text classification category. To illustrate, after reviewing the second document sample 146, the user may determine that the TOI 126, as used in the second document sample 146, does not have the meaning associated with the text classification category. For example, if the TOI 126 is "Queen" and the user is labeling document samples 142 associated with a "music groups" text classification category, the user may review the second document sample 146 and determine that the use of the term "Queen" in the second document sample 146 is a reference to a monarch rather than to the band Queen. Accordingly, the second document sample 146 can be designated a negative example of the text classification category.

In some implementations, the user interface 120 allows the user to designate more than one TOI 126 or to designate the TOI 126 in two or more distinct contexts to facilitate distinguishing two or more terms. For example, when the document corpus 114 is likely to contain two or more confusingly similar terms, such as "Queen" referring to the band and "Queen" referring to a monarch, the user interface 120 can be used to designate a first term in a first context (i.e., a first TOI 126A) and a second term in a second context (i.e., a second TOI 126B). In this example, the first TOI 126A can correspond to Queen where the context is a discussion of a band, and the second TOI 126B can correspond to Queen were the context is a discussion of the monarchy. In this example, when a MLT search is performed, the similarity search engine 168 identifies a first set of terms that are semantically similar to the first TOI 126A and a second set of terms that are semantically similar to the second TOI 126B. Further, the dissimilarity search engine 170 identifies a third set of terms that are semantically dissimilar to both the first TOI 126A and the second TOI 126B.

Each term of the third set of terms contains one of the TOIs 126A or 126B or a semantically similar term, yet each term of the third set of terms is semantically dissimilar to both the first TOI 126A or the second TOI 126B. Accordingly, the terms of the third set of terms are likely to be misclassified by a trained classifier unless the user is able to provide distinguishing examples. In this situation, the second user interface 140 displays examples from the third set of terms to facilitate identifying distinguishing examples.

The instructions 110 are executable by the processor(s) 104 to generate labeled training data 180 based on labels assigned by the user. On technical benefit of the system of FIG. 1 is the inclusion of both semantically similar and semantically dissimilar word groups in the MLT search results list, as opposed to traditional keyword search results which only look for the occurrence of a particular word and do not consider issues of context semantic similarity. Further, by including both semantically similar and semantically dissimilar word groups in the MLT search results list, the computing device 102 reduces the processing time and resources (as well as user time and effort) required to generate positive and negative examples in the labeled training data 180 as compared to traditional techniques. The use of positive and negative examples in the labeled training data 180 can improve the accuracy of category assignments by (e.g., improve operation of) the text classifier 178.

Figure 2:
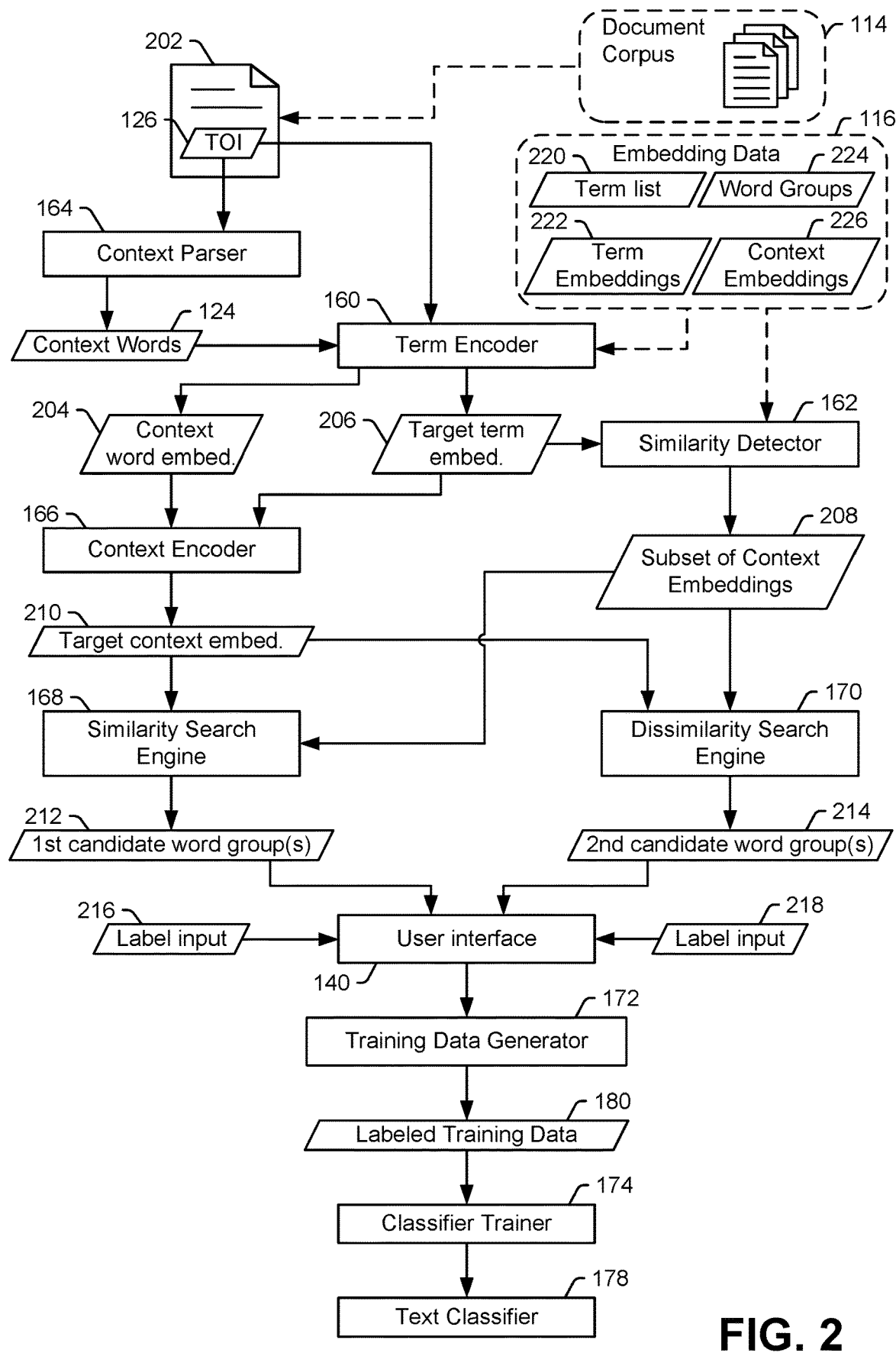
FIG. 2 illustrates a particular example of operations performed by the system of FIG. 1 to generate labeled training data and train a text classifier.

Details of a specific example of operation of the system 100 are described with reference to FIG. 2. In FIG. 2, the various functional instruction sets of the instructions 110 are illustrated along with examples of data that is input to or output by each of the functional instruction sets.

In FIG. 2, a computing device, such as the computing device 102 of FIG. 1, receives input designating the TOI 126 in a document 202 of the document corpus 114. For example, a user can use the first user interface 120 of FIG. 1 to review the document 202 (as one or more document samples 122). In this example, the user can select the TOI 126 in a particular document sample 122 to generate the user input 136 designating the TOI 126.

The computing device 102 executes the context parser 164 to identify the context words 124 based on the document 202 and the input designating the TOI 126. In a particular implementation, the context words 124 correspond to or include a specified number of words around the TOI 126 in the document 202. For example, the context words 124 can include five words before (e.g., immediately preceding) the TOI 126 in the document 202 and five words after (e.g., immediately following) the TOI 126 in the document 202. In other examples, the context words 124 include more words (e.g., ten words before and ten words after the TOI 126) or fewer words (e.g., three words before and three words after the TOI 126). Further, in some examples, the context words 124 include a different number of words before the TOI 126 than after the TOI 126, such as seven words before and ten words after the TOI 126.

In another particular implementation, the context parser 164 identifies a grammatical structure (e.g., a sentence or paragraph) that includes the TOI 126 and selects as the context words 124 the remaining words of the grammatical structure. For example, when the grammatical structure is a sentence, the context parser 164 selects as the context words 124 the words of the sentence other than the TOI 126. To illustrate, the context parser 164 can scan through portions of the document 202 that precede the TOI 126 to identify first punctuation indicating the beginning of the sentence, scan through portions of the document 202 that follow the TOI 126 to identify second punctuation indicating the end of the sentence, and select as the context words 124 all of the words other than the TOI 126 between the first and second punctuation. In some implementations, the context parser 164 can includes words of one or more adjacent sentences in the context words 124. For example, the context parser 164 can select the context words 124 from a first sentence that includes the TOI 126, a second sentence that follows the first sentence, and a third sentence that precedes the first sentence.

In yet other implementations, the context parser 164 uses a combination of grammatical structures and word counts to identify the context words 124. For example, the context words 124 can include the shorter of a full sentence or a specified number of words. To illustrate, the context parser 164 can start from the TOI 126 and scan the document 202 in both directions to identify up to ten context words 124. In this illustrative example, if the context parser 164 reaches punctuation indicating the end of the sentence before ten context words 124 have been identified, the context parser 164 stops searching for context words 124 after the TOI 126, but continues to search for context words 124 before the TOI 126 until either ten context words 124 have been identified or the beginning of the sentence is reached. Thus, in this example, the context words 124 include five words before and five words after the TOI 126 if the sentence that includes the TOI 126 includes five words before and five words after the TOI 126. However, if the sentence includes fewer than five words on a first side of the TOI 126 and more than five words on a second side of the TOI 126, the context words 124 include fewer than five words on the first side of the TOI 126 and more than five words on the second side of the TOI 126. If the total length of the sentence is less than ten words plus the length of the TOI 126, then the context words 124 include fewer than ten words.

The computing device 102 executes the term encoder 160 to map the TOI 126 and each of the context words 124 into a term embedding space. For example, the term encoder 160 determines a target term embedding 206 representing the TOI 126 and determines context word embeddings 204 representing the context words 124. The target term embedding 206 and context word embeddings 204 are instances of term embeddings 222, as distinct from context embeddings 226 which are included in embedding data 116 and are further described below. A term embedding 222 is a vector of values representing syntactic and semantic relationships among words in an analyzed set of documents. The set of documents can include or correspond to the document corpus 114, or the set of documents can be independent of the document corpus 114. For example, when the document corpus 114 includes documents in English, the term embeddings 222 can be generated based on analysis of a distinct data set of English language documents. In this example, the term embeddings 222 represent syntactic and semantic relationships among English language words in general, rather than of the documents in document corpus 114 in particular. Alternatively, the term embeddings 222 may be determined based on the documents in the document corpus 114, such as via a continuous bag of words (CBOW) process or a skip-gram process.

In a particular implementation, the term embeddings 222 are stored in a database 112, such as in a look-up table or other data structure of the embedding data 116, and the target term embedding 206, the context word embeddings 204, or both, are determined by looking up corresponding terms in the term embeddings 222. For example, the document corpus 114 can be used to generate a term list 220 identifying all of the terms (or words) that appear in the document corpus 114, and the embedding data 116 can include a term embedding 222 for each term of the term list 220. In this example, the term encoder 160 looks up the TOI 126 in the embedding data 116 to determine the target term embedding 206 and looks up each of the context words 124 to determine a respective context word embedding 204.

In another particular implementation, the target term embedding 206, the context word embeddings 204, or both, are determined dynamically by providing data representing each term to be mapped as input to a trained term embedding network. In this implementation, in response to input corresponding to a particular word or term, the trained term embedding network generates output corresponding to a term embedding representing the word or term. For example, when the TOI 126 is provided as input to the trained term embedding network, the trained term embedding network outputs the target term embedding 206. Likewise, when one of the context words 124 is provided as input to the trained term embedding network, the trained term embedding network outputs a context word embedding 204 representing the context word.

In some implementations, the target term embedding 206 is provided to the similarity detector 162. In such implementations, the similarity detector 162 compares the target term embedding 206 to the term embeddings 222 of the embedding data 116 to determine whether the document corpus 114 includes one or more terms that are semantically similar to the TOI 126. If the similarity detector 162 determines that the document corpus 114 includes one or more terms that are semantically similar to the TOI 126, the similarity detector 162 generates a list of the semantically similar terms and uses the list of the semantically similar terms to identify a subset 208 of the context embeddings 226, where the subset 208 includes context embeddings 226 for word groups 224 that include the semantically similar terms. The similarity detector 162 can also, or in the alternative, include in the subset 208 context embeddings 226 of word groups 224 that include the term of interest 126. Thus, the subset 208 includes context embeddings 226 representing word groups 224 that include the TOI 126, for word groups 224 that include a term semantically similar to the TOI 126, or both.

The similarity detector 162 identifies the semantically similar terms based on distances between the target term embedding 206 and term embeddings 222 representing terms from the document corpus 114. For example, the similarity detector 162 may determine values of distance metrics between the target term embedding 206 and term embeddings 222 of terms in the term list 220. Terms represented by term embeddings 222 that satisfy a similarity metric with respect to the target term embedding 206 (e.g., are within a threshold distance of the target term embedding 206 in term embedding space) are identified as semantically similar terms of the TOI 126.

The computing device 102 executes the context encoder 166 to determine a target context embedding 210 representing a target word group, where the target word group includes the TOI 126 and the context words 124. The target context embedding 210 is a vector of values representing syntactic and semantic relationships among groups of words of the document corpus 114. The vector of values represents a point in a feature space (referred to herein as a context embedding space).

In a particular implementation, the target context embedding 210 representing the target word group is determined by providing term embeddings representing the target word group (e.g., the target term embedding 206 and the context word embeddings 204) as input to a trained context embedding network. In another implementation, the embedding data 116 includes a vector (e.g., a context embedding 226) for each word group 224 of the document corpus 114. In this implementation, the target context embedding 210 representing the target word group is determined by looking up the target context embedding 210 in the context embeddings 226.

In some implementations, the context embeddings 226 representing the word groups 224 of the document corpus 114 can be determined in advance (e.g., as a pre-processing operation before receiving input indicating the TOI 126) using the trained context embedding network. For example, in FIG. 2, the embedding data 116 includes data identifying the word groups 224 of the document corpus 114. Each word group 224 is identified on the same basis that the context parser 164 uses to identify the context words 124. For example, if the context parser 164 selects the context words 124 such that the context words 124 include a particular number of words (e.g., eleven words including the TOI 126) of the document 202, then the word groups 224 correspond to blocks of the particular number of words (e.g., eleven words) from documents of the document corpus 114. To illustrate, the word groups 224 can be determined by using a sliding window of eleven words to parse each document of the document corpus 114. In another example, if the context parser 164 selects the context words 124 based on a grammatical structure (e.g., a sentence), then the word groups 224 correspond to blocks of words in corresponding grammatical structures (e.g., sentences) of the document corpus 114. To illustrate, each sentence of the document corpus 114 can correspond to a word group 224.

Figure 3:
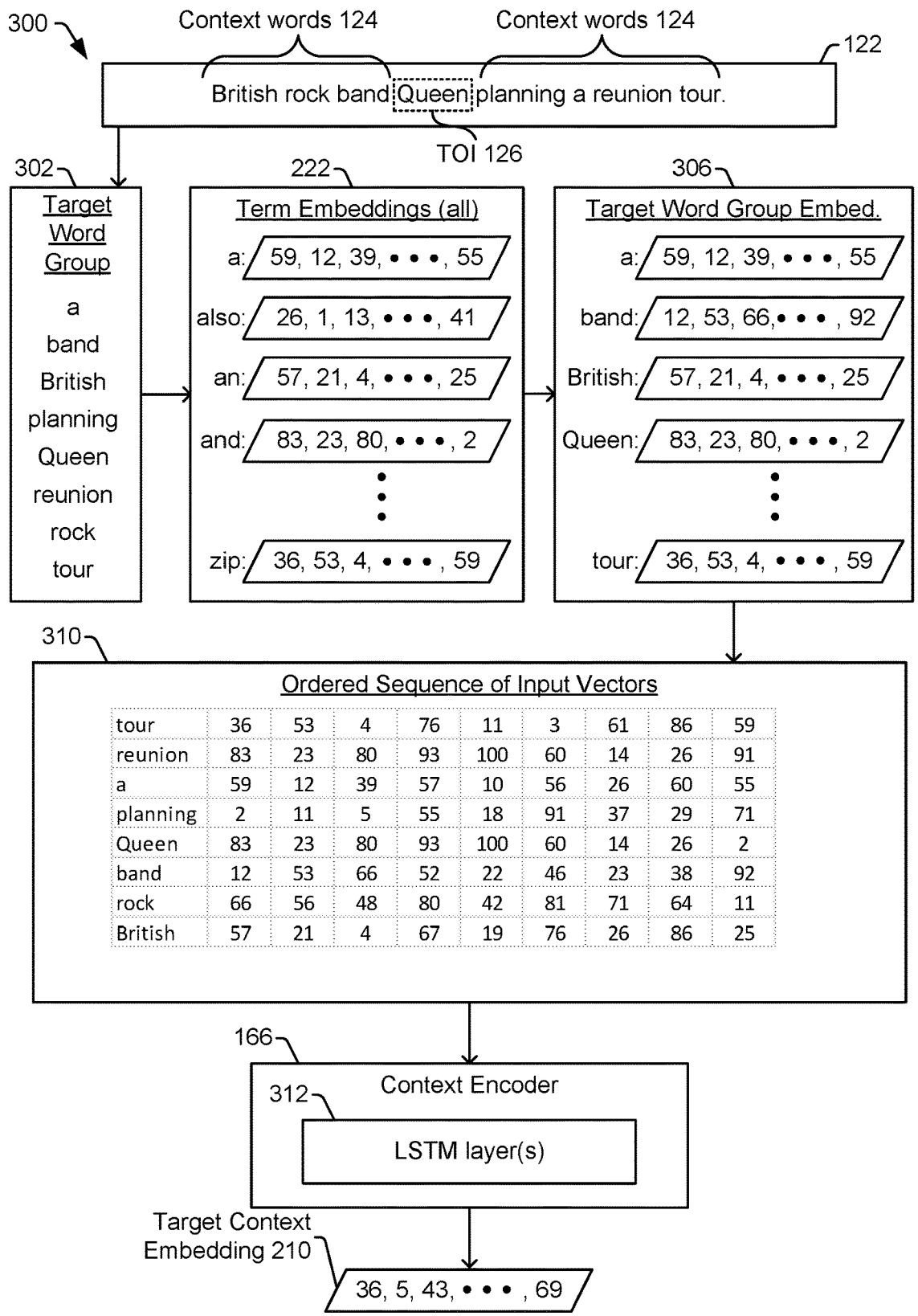
FIG. 3 illustrates a particular example of operations performed by the system of FIG. 1 to generate embedding data for a text sample including a term of interest and context terms.

In a particular implementation, the trained context embedding network includes a neural network with one or more recurrent structures, such as one or more long short term memory layers, as described further with reference to FIG. 3. In this implementation, the term embeddings 222 representing words of a word group 224 are input to the neural network as an ordered sequence of input vectors, where each input vector of the ordered sequence of input vectors represents a corresponding word of the word group 224. For example, if the TOI 126 is a single word and the context parser 164 selected three words on either side of the TOI 126 as the context words, then the target word group includes seven words (e.g., three preceding context words, the TOI 126, and three following context words). In this example, the term embeddings 222 representing the words of the target word group are provided as input to the trained context embedding network in the order that the words appear in the document: a first context word embedding corresponding to a first preceding context word, a second context word embedding corresponding to a second preceding context word, a third context word embedding corresponding to a third preceding context word, the target term embedding, a fourth context word embedding corresponding to a first following context word, a fifth context word embedding corresponding to a second following context word, a sixth context word embedding corresponding to a third following context word. In other examples, this order is reversed such that the sixth context word embedding corresponding to the third following context word is input first and the first context word embedding corresponding to the first preceding context word is input last.

In some implementations, the target context embedding 210 is provided as input to the similarity search engine 168. The similarity search engine 168 identifies, from among the context embeddings 226 or the subset 208, one or more context embeddings corresponding to first candidate word groups 212. Each word group of the first candidate word groups 212 is semantically similar to the target word group based on a distance between the target context embedding 210 and context embeddings of the first candidate word group(s) 212. For example, each context embedding is a vector of values representing a point in context embedding space. The similarity search engine 168 determines a value of a distance metric (e.g., a Euclidean distance, a Cosine distance, a Manhattan distance, etc.) representing the distance between two points in the context embedding space, where one of the points represents the target context embedding 210 and the other point corresponds to one of the context embeddings 226 of the embedding data 116 or of the subset 208.

The first candidate word group(s) 212 output by the similarity search engine 168 correspond to the word groups 224 of the document corpus 114 that are most similar to (e.g., nearest to in context embedding space) the target context embedding 210. In some implementations, the first candidate word group(s) 212 include a specified number of the word groups 224 of the document corpus 114 that are most similar to the target context embedding 210, such as the three most similar word groups. In other implementations, the first candidate word group(s) 212 include each the word groups 224 of the document corpus 114 that satisfies a similarity threshold (e.g., is within a threshold distance in the context embedding space to the target context embedding 210). In still other implementations, the similarity search engine 168 uses another selection criterion to select the first candidate word group(s) 212 or uses a combination of selection criteria. To illustrate, the first candidate word group(s) 212 can include up to a specified number of the word groups 224 of the document corpus 114 that satisfy the similarity threshold. In this example, if no word group satisfies the similarity threshold, a null search result is returned.

In some implementations, the subset 208 includes only context embeddings 226 for word groups 224 that include the TOI 126, and the first candidate word group(s) 212 are selected by the similarity search engine 168 from among the subset 208. Thus, in such implementations, each of the first candidate word groups 212 includes the TOI 126. In other implementations, the subset 208 includes context embeddings 226 for word groups 224 that include the TOI 126 and for word groups 224 that include a term that is semantically similar to the TOI 126. In such implementations, each of the first candidate word group(s) 212 selected by the similarity search engine 168 includes the TOI 126 or a term that is semantically similar to the TOI 126.

In some implementations, the target context embedding 210 is also provided as input to the dissimilarity search engine 170. The dissimilarity search engine 170 identifies, from among the subset 208, one or more context embeddings corresponding to second candidate word groups 214. Each word group of the second candidate word groups 214 includes the TOI 126 or a term semantically similar to the TOI 126 and is semantically dissimilar to the target word group based on a distance between the target context embedding 210 and a context embedding of the second candidate word group(s) 214. For example, the dissimilarity search engine 170 determines a value of a distance metric (e.g., a Euclidean distance, a Cosine distance, a Manhattan distance, etc.) representing the distance between two points in the context embedding space, where one of the points represents the target context embedding 210 and the other point corresponds to one of the context embeddings 226 of the subset 208. In this example, the dissimilarity search engine 170 determines that a word group is semantically dissimilar to the target word group when the distance metric satisfies a dissimilarity criterion. The dissimilarity criterion is satisfied by a particular context embedding when the distance, in the context embedding space, between the context embedding and the target context embedding 210 is greater than a threshold or when the context embedding is a greater distance from the target context embedding 210 than the distances of other context embeddings of the subset 208 from the target context embedding 210. For example, the second candidate word group(s) 214 output by the dissimilarity search engine 170 may correspond to context embeddings of the subset 208 that are most distant from the target context embedding 210 in the context embedding space. In this example, the second candidate word group(s) 214 may include a specified number of the word groups 224 of the document corpus 114 that are least similar to the target word group, such as the three least similar word groups. In another example, the second candidate word group(s) 214 include each the word groups represented in the subset 208 that is more distant than a dissimilarity threshold (e.g., is further than a threshold distance in the context embedding space from the target context embedding 210). In still other implementations, the dissimilarity search engine 170 uses another selection criterion to select the second candidate word group(s) 214 or uses a combination of selection criteria. To illustrate, the second candidate word group(s) 214 can include up to a specified number of the word groups 224 that satisfy the dissimilarity threshold. In this example, if no word group satisfies the dissimilarity threshold, a null search result is returned.

The first candidate word group(s) 212, the second candidate word group(s) 214, or both, are provided as output to the user via the user interface 140. For example, the user interface 140 identifies the first candidate word group(s) 212 as one or more document samples of the document samples 142 and identifies the second candidate word group(s) 214 as one or more other document samples of the document samples 142.

The user can interact with the user interface 140 to assign one or more of the document samples 142 (e.g., one or more of the first candidate word groups 212, the second candidate word groups 214, or both) to a text classification category. For example, the user can provide first label input 216 to assign a particular label (e.g., a text classification category identifier) to one or more of the first candidate word groups 212. In this example, based on the first label input 216, the training data generator 172 stores the one or more of the first candidate word groups 212 associated with the first label input 216 as positive examples of the text classification category associated with the particular label. The user can also, or in the alternative, provide second label input 218 to indicate that one or more of the second candidate word groups 214 is a negative example of the particular label (e.g., the text classification category identifier). Based on the second label input 218, the training data generator 172 stores the one or more of the second candidate word groups 214 associated with the second label input 218 as negative examples of the text classification category associated with the particular label.

In some situations, the user can provide the first label input 216 to assign the particular label to one or more of the second candidate word groups 214 or can provide the second label input 218 to assign the particular label to one or more of the first candidate word groups 212. As indicated above, the first candidate word group(s) 212 are word groups of the document corpus 114 that the similarity search engine 168 identified as semantically similar to the target word group, and the second candidate word group(s) 214 are word groups of the document corpus 114 that the dissimilarity search engine 170 found to be semantically dissimilar to the target word group. However, such automated semantical similarity/dissimilarity search processes can misclassify some word groups in ways that are simple for subject matter experts to identify. For example, when the context parser 164 parses documents into individual sentences, the similarity search engine 168 and the dissimilarity search engine 170 each analyze context embeddings for one sentence at a time. However, in some documents, a full paragraph may need to be read to understand the correct context. In such situations, the similarity search engine 168 may determine that a sentence should be included in the first candidate word group(s) 212 even though the paragraph, as a whole, would indicate to a human subject matter expert that the sentence is not related to the same subject matter (e.g., is not semantically similar to) the target word group. Alternatively, the dissimilarity search engine 170 may determine that a sentence should be included in the second candidate word group(s) 214 even though the paragraph, as a whole, would indicate to a human subject matter expert that the sentence is related to the same subject matter (e.g., is semantically similar to) the target word group. In either of these situations, the user, after reviewing the document samples 142 presented in the user interface 140, can correct the mistake and properly assign a document sample 142 as a positive or negative example of the particular label. Such corrections by the user can significantly improve the text classifier's accuracy in assigning of classification labels.

The training data generator 172 generates the labeled training data 180. For example, the training data generator 172 stores or modifies one or more data structures (e.g., data tables) to indicate which word groups of the first and second candidate word groups 212, 214 are assigned as positive or negative examples of each of one or more labels (or text classification categories).

In many instances, a user can use the computing device 102 to label word groups based on several MLT searches, multiple TOIs 126, etc. to generate a complete set of labeled training data 180 that is representative of the document corpus 114 and the goals or interests of the user. In such instances, the user can repeat the operations described above before training the text classifier 178. For example, the user can perform a keyword search of the document corpus to find an occurrence of a keyword that should be assigned as a positive example of a particular label. The user can designate the occurrence of the keyword as a TOI 126 in one of the document samples 122 of the user interface 120 and perform a MLT search based on the document sample. The user can designate one or more of the document samples 142 displayed in response to the MLT search as a positive or negative example of the particular label to cause additional labeled training data to be generated.

The labeled training data 180 is provided as input to the classifier trainer 174. The classifier trainer 174 performs supervised learning operations using the labeled training data 180 to generate the text classifier 178. The specific supervised learning operations may depend on the type of text classifier 178 that is generated. In some implementations, the classifier trainer 174 is configured to generate multiple text classifiers (e.g., multiple preliminary text classifiers) based on the labeled training data 180. In such implementations, the multiple preliminary text classifiers may be of different types, such as a neural network-based classifier, a decision tree-based classifier, a support vector machine-based classifier, a regression-based classifier, a perceptron-based classifier, a naive Bayes-based classifier, a document classifier using another machine learning process, or a combination thereof. In such implementations, a best performing of the multiple preliminary text classifiers can be designated as the text classifier 178.

FIG. 3 illustrates a particular example 300 of operations performed by the system of FIG. 1 to generate embedding data for a text sample including a term of interest and context terms. In FIG. 3, a particular document sample 122 of the document corpus 114 is illustrated. The document sample 122 includes the example sentence "British rock band Queen planning a reunion tour," in which the term "Queen" is the TOI 126.

In the example of FIG. 3, the context parser 164 parses a document into sentences to identify a target word group 302 which includes the TOI 126 and context words 124, which correspond to other words of the sentence besides the TOI 126. Thus, in FIG. 3, the target word group 302 includes the words "a," "band," "British," "planning," "Queen," "reunion," "rock," and "tour."

In the example illustrated in FIG. 3, the embedding data 116 includes the term embeddings 222 for each term in the document corpus 114. Each term embedding is a vector of values representing a location in an embedding space. Although FIG. 3 illustrates the values as integers, in other implementations the values are floating point values, such as values between 0 and 1.

In the example illustrated in FIG. 3, the term encoder 160 looks up the term embeddings 222 of the terms of the target word group 302 to identify target word group embeddings 306, which correspond to word embeddings for words of the target word group 302. As described with reference to FIG. 2, in some implementations, rather than looking up the target word group embeddings 306, the term encoder 160 generates that target word group embeddings 306 using a trained embedding network (e.g., a neural network).

The target word group embeddings 306 are provided as an ordered sequence of input vectors 310 to the context encoder 166. For example, the vectors corresponding to the target word group embeddings 306 are arranged in the ordered sequence of input vectors 310 based on an order of the target word group in the document. To illustrate, a first input vector of the ordered sequence of input vectors 310 corresponds to the word "British," which is the first word of the sentence in the document sample 122 corresponding to the target word group 302. Likewise, a last input vector of the ordered sequence of input vectors 310 corresponds to the word "tour," which is the last word of the sentence in the document sample 122 corresponding to the target word group 302. In other implementations, the order of the ordered sequence of input vectors 310 is reversed. To illustrated, in such implementations, ordered sequence of input vectors 310 illustrated in FIG. 3 would have the vector corresponding to "tour" as the first input vector and the vector corresponding to "British" as the last input vector.

The context encoder 166 includes a neural network-based embedding network with one or more recurrent structures to take into account the order of the input vectors. In the example illustrated in FIG. 3, the recurrent structures include or correspond to one or more long short term memory (LSTM) layers 312. The context encoder 166 generates the target context embedding 210 responsive to input of the ordered sequence of input vectors 310.

Figure 4:
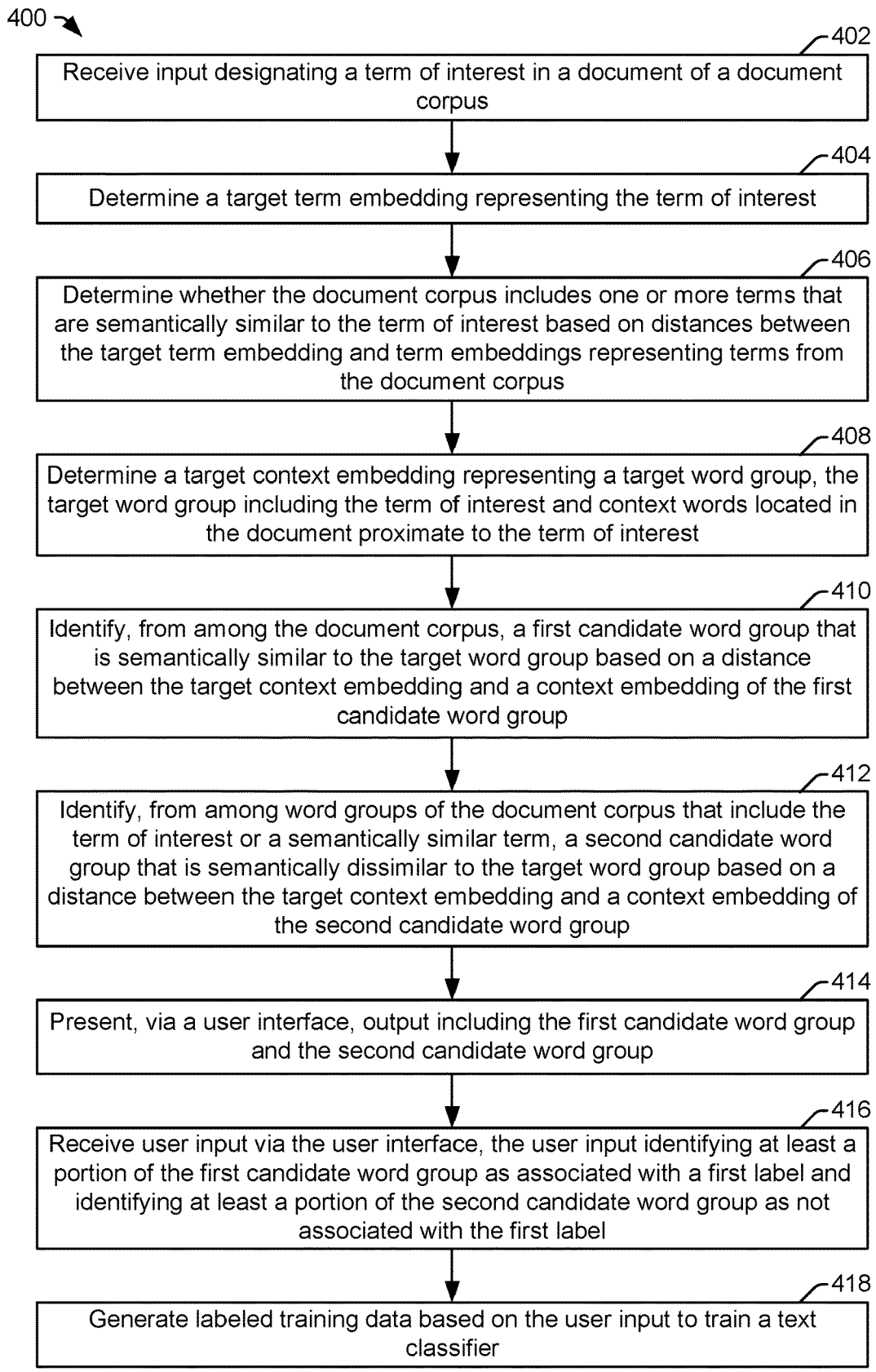
FIG. 4 illustrates a flow chart of a particular example of a method of generating labeled training data.

FIG. 4 illustrates a flow chart of a particular example of a method 400 of generating labeled training data to train a text classifier for a document corpus. The method 400 can be initiated, performed, or controlled by the processor(s) 104 executing the instructions 110 of FIG. 1.

The method 400 includes, at 402, receiving, at a computing device, input designating a term of interest in a document of the document corpus. For example, a user can select or otherwise designate the TOI 126 in a display of the document samples 122 in the user interface 120. In some implementations, the user can designate the TOI 126 via keyword search, and the document samples 122 can correspond to or include keyword search results listing. In such implementations, the user can select from the document samples 122 a particular document sample that includes the TOI 126 in proper context. The user can implement a MLT search based on the particular document sample and TOI 126.

The method 400 includes, at 404, determining a target term embedding representing the term of interest. For example, the term encoder 160 can determine the target term embedding 206 as described with reference to FIGS. 1 and 2. To illustrate, the term encoder 160 can include an embedding network that takes the TOI 126 as input and generates the target term embedding 206 using a trained neural network. In another example, the term encoder 160 can look up the target term embedding 206 in embedding data 116 associated with the document corpus 114.

The method 400 includes, at 406, determining whether the document corpus includes one or more terms that are semantically similar to the term of interest based on distances between the target term embedding and term embeddings representing terms from the document corpus. For example, the target term embedding 206 and the term embeddings 222 associated with the document corpus 114 can be viewed as points in a word embedding space. In this example, the similarity detector 162 can calculate a distance metric (e.g., a Euclidean distance, a Cosine distance, a Manhattan distance, etc.) between the target term embedding 206 and one or more other points of the term embeddings 222. In this example, a term is considered to be semantically similar to the TOI 126 if the distance metric satisfies (e.g., the distance is less than or equal to) a distance threshold.

The method 400 includes, at 408, determining a target context embedding representing a target word group, where the target word group includes the term of interest and context words located in the document proximate to the term of interest. For example, the context encoder 166 can use the target term embedding 206 and context word embeddings 204 to determine the target context embedding 210 as described in detail with reference to FIG. 3.

The method 400 includes, at 410, identifying, from among the document corpus, a first candidate word group that is semantically similar to the target word group based on a distance between the target context embedding and a context embedding of the first candidate word group. For example, the target context embedding 210 and the context embeddings 226 associated with the document corpus 114 can be viewed as points in a context embedding space. In this example, the similarity search engine 168 can calculate a distance metric (e.g., a Euclidean distance, a Cosine distance, a Manhattan distance, etc.) between the target context embedding 210 and one or more other points of the subset 208 of context embeddings, where the subset 208 of context embeddings corresponds to context embeddings of word groups 224 of the document corpus 114 that include the TOI 126. In some implementations, the subset 208 can also include context embeddings of word groups 224 of the document corpus 114 that include a term that is semantically similar to the TOI 126. In this example, a word group is considered to be semantically similar to the target word group 302 if the distance metric satisfies (e.g., the distance is less than or equal to) a distance threshold.

The method 400 includes, at 412, identifying, from among word groups of the document corpus that include the term of interest or a semantically similar term, a second candidate word group that is semantically dissimilar to the target word group based on a distance between the target context embedding and a context embedding of the second candidate word group. For example, the dissimilarity search engine 170 can calculate a distance metric (e.g., a Euclidean distance, a Cosine distance, a Manhattan distance, etc.) between the target context embedding 210 and one or more other points of the subset 208 of context embeddings, where the subset 208 of context embeddings corresponds to context embeddings of word groups 224 of the document corpus 114 that include the TOI 126 and word groups 224 of the document corpus 114 that include a term that is semantically similar to the TOI 126. In this example, a word group is considered to be semantically dissimilar to the target word group 302 if the distance metric satisfies (e.g., the distance is greater than or equal to) a dissimilarity threshold.

The method 400 includes, at 414, presenting, via a user interface, output including the first candidate word group and the second candidate word group. For example, the computing device 102 can generate the user interface 140, which includes document samples 142 corresponding to or including the first candidate word group and the second candidate word group. In some implementations, the TOI 126 or a term that is semantically similar to the TOI 126 can be visually distinguished in each document sample 142.

The method 400 includes, at 416, receiving user input via the user interface, where the user input identifies at least a portion of the first candidate word group as associated with a first label and identifies at least a portion of the second candidate word group as not associated with the first label. For example, the user can provide the user input 152 via the user interface 140. In this example, the user input 152 can include information designating one or more of the document samples 142 as a positive example of a particular text classification category (e.g., the first label) and can include information designating one or more of the document samples 142 as a negative example of the particular text classification category (e.g., the first label).

The method 400 includes, at 418, generating labeled training data based on the user input to train the text classifier. For example, the training data generator 172 can receive the user input 152 and store a label or other data associating (either as positive examples or as negative examples) particular document samples or word groups with particular labels in the labeled training data 180.

The method 400 can also include generating the text classifier 178 using the labeled training data 180. For example, the classifier trainer 174 can use one or more machine learning techniques to train the text classifier 178. Thus, the method 400 simplifies the generation of the labeled training data 180 and the generation of the text classifier 178 by assisting the user with identifying other text samples that are similar to a labeled text sample in order to label positive samples, negative samples, or both. As a result, processing time and resources required to generate the text classifier 178 are reduced. Further, the accuracy of the text classifier 178 can be improved by providing both positive and negative examples of the particular text classification categories.

Figure 5:
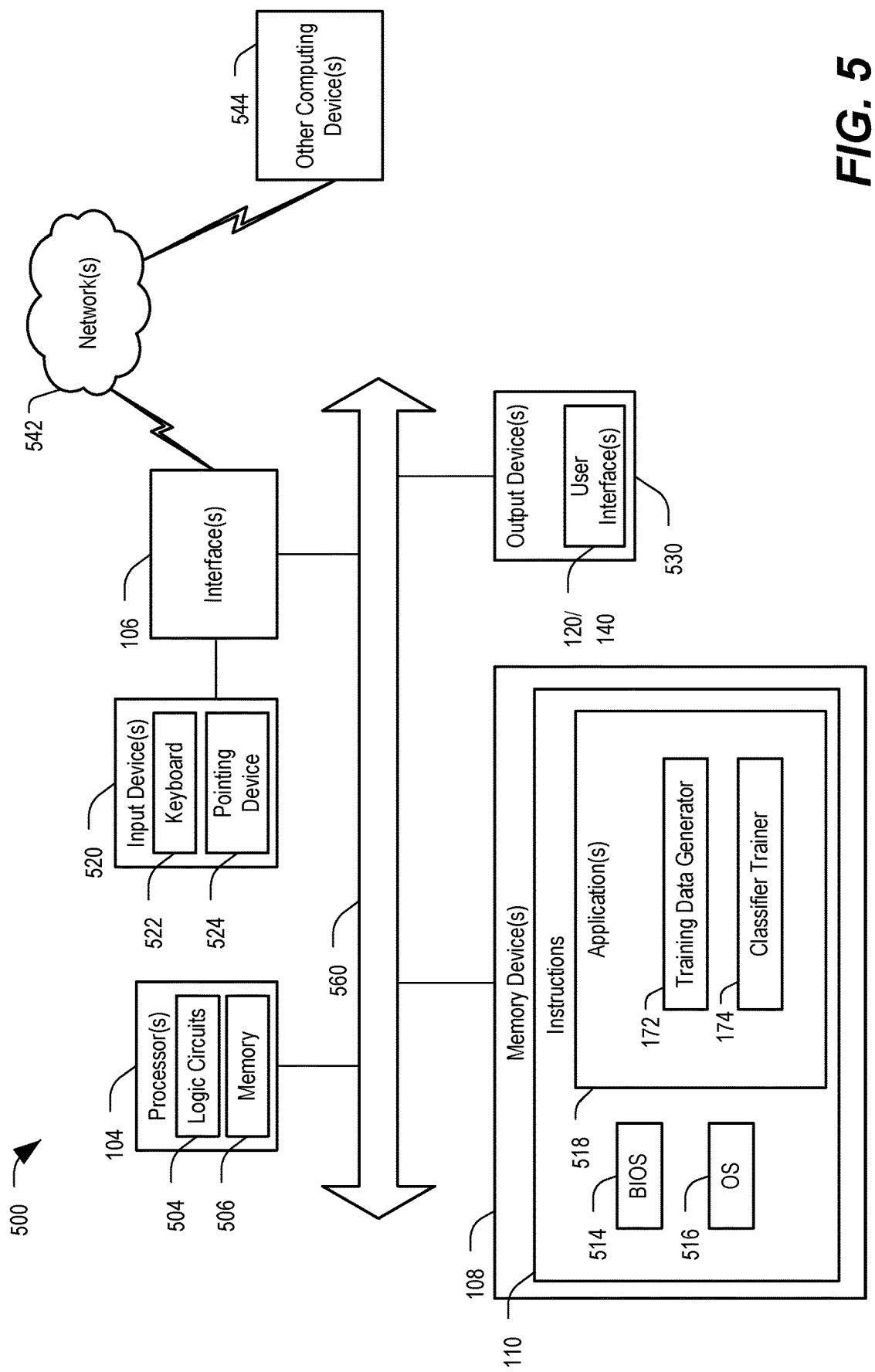
FIG. 5 illustrates a particular example of a computer system including hardware and software configured to generate labeled training data to train a text classifier.

FIG. 5 is a block diagram of a particular computer system 500 configured to initiate, perform, or control one or more of the operations described with reference to FIGS. 1-4. For example, the computer system 500 may include, or be included within, the computing device 102 of FIG. 1. The computer system 500 can be implemented as or incorporated into one or more of various other devices, such as a personal computer (PC), a tablet PC, a server computer, a personal digital assistant (PDA), a laptop computer, a desktop computer, a communications device, a wireless telephone, or any other machine capable of executing a set of instructions (sequential or otherwise) that specify actions to be taken by that machine. Further, while a single computer system 500 is illustrated, the term "system" includes any collection of systems or sub-systems that individually or jointly execute a set, or multiple sets, of instructions to perform one or more computer functions.

While FIG. 5 illustrates one example of the particular computer system 500, other computer systems or computing architectures and configurations may be used for carrying out the automated model building operations disclosed herein. The computer system 500 includes the one or more processors 104. Each processor of the one or more processors 104 can include a single processing core or multiple processing cores that operate sequentially, in parallel, or sequentially at times and in parallel at other times. Each processor of the one or more processors 104 includes circuitry defining a plurality of logic circuits 504, working memory 506 (e.g., registers and cache memory), communication circuits, etc., which together enable the processor to control the operations performed by the computer system 500 and enable the processor to generate a useful result based on analysis of particular data and execution of specific instructions.

The processor(s) 104 are configured to interact with other components or subsystems of the computer system 500 via a bus 560. The bus 560 is illustrative of any interconnection scheme serving to link the subsystems of the computer system 500, external subsystems or device, or any combination thereof. The bus 560 includes a plurality of conductors to facilitate communication of electrical and/or electromagnetic signals between the components or subsystems of the computer system 500. Additionally, the bus 560 includes one or more bus controller or other circuits (e.g., transmitters and receivers) that manage signaling via the plurality of conductors and that cause signals sent the plurality of conductors to conform to particular communication protocols.

The computer system 500 also includes the one or more memory devices 108. The memory devices 108 include any suitable computer-readable storage device depending on, for example, whether data access needs to be bi-directional or unidirectional, speed of data access required, memory capacity required, other factors related to data access, or any combination thereof. Generally, the memory devices 108 includes some combinations of volatile memory devices and non-volatile memory devices, though in some implementations, only one or the other may be present. Examples of volatile memory devices and circuits include registers, caches, latches, many types of random-access memory (RAM), such as dynamic random-access memory (DRAM), etc. Examples of non-volatile memory devices and circuits include hard disks, optical disks, flash memory, and certain type of RAM, such as resistive random-access memory (ReRAM). Other examples of both volatile and non-volatile memory devices can be used as well, or in the alternative, so long as such memory devices store information in a physical, tangible medium. Thus, the memory devices 108 include circuit and structures and are not merely signals or other transitory phenomena.

The memory device(s) 108 store the instructions 110 that are executable by the processor(s) 104 to perform various operations and functions. The instructions 110 include instructions to enable the various components and subsystems of the computer system 500 to operate, interact with one another, and interact with a user, such as an input/output system (BIOS) 514 and an operating system (OS) 516. Additionally, the instructions 110 include one or more applications 518, scripts, or other program code to enable the processor(s) 104 to perform the operations described herein. For example, the instructions 110 can include the training data generator 172 and the classifier trainer 174, as explained with reference to FIGS. 1-4.

In FIG. 5, the computer system 500 also includes one or more output devices 530, one or more input devices 520, and one or more interface devices 106. Each of the output device(s) 530, the input device(s) 520, and the interface device(s) 106 can be coupled to the bus 560 via an a port or connector, such as a Universal Serial Bus port, a digital visual interface (DVI) port, a serial ATA (SATA) port, a small computer system interface (SCSI) port, a high-definition media interface (HMDI) port, or another serial or parallel port. In some implementations, one or more of the output device(s) 530, the input device(s) 520, the interface device(s) 106 is coupled to or integrated within a housing with the processor(s) 104 and the memory devices 108, in which case the connections to the bus 560 can be internal, such as via an expansion slot or other card-to-card connector. In other implementations, the processor(s) 104 and the memory devices 108 are integrated within a housing that includes one or more external ports, and one or more of the output device(s) 530, the input device(s) 520, the interface device(s) 106 is coupled to the bus 560 via the external port(s).

Examples of the output device(s) 530 include display devices, speakers, printers, televisions, projectors, or other devices to provide output of data in a manner that is perceptible by a user, such as via the user interfaces 120/140. Examples of the input device(s) 520 include buttons, switches, knobs, a keyboard 522, a pointing device 524, a biometric device, a microphone, a motion sensor, or another device to detect user input actions. The pointing device 524 includes, for example, one or more of a mouse, a stylus, a track ball, a pen, a touch pad, a touch screen, a tablet, another device that is useful for interacting with a graphical user interface, or any combination thereof.

The interface device(s) 106 is configured to enable the computer system 500 to communicate with one or more other computer system 544 via one or more networks 542. The interface device(s) 106 encode data in electrical and/or electromagnetic signals that are transmitted to the other computer system(s) 544 using pre-defined communication protocols. The electrical and/or electromagnetic signals can be transmitted wirelessly (e.g., via propagation through free space), via one or more wires, cables, optical fibers, or via a combination of wired and wireless transmission.

In an alternative embodiment, dedicated hardware implementations, such as application specific integrated circuits, programmable logic arrays and other hardware devices, can be constructed to implement one or more of the operations described herein. Accordingly, the present disclosure encompasses software, firmware, and hardware implementations.

It is to be understood that the division and ordering of steps described herein is for illustrative purposes only and is not be considered limiting. In alternative implementations, certain steps may be combined and other steps may be subdivided into multiple steps. Moreover, the ordering of steps may change.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Computer program instructions may be loaded onto a computer or other programmable data processing apparatus to produce a machine, such that the instructions that execute on the computer or other programmable data processing apparatus create means for implementing operations or functions specified in flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the operation or function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the operations or functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

Changes and modifications may be made to the disclosed embodiments without departing from the scope of the present disclosure. These and other changes or modifications are intended to be included within the scope of the present disclosure, as expressed in the following claims.

What is claimed is:

1. A method of generating a text classifier for a document corpus, the method comprising:
   receiving, at a computing device, input designating a term of interest in a document of the document corpus;
   determining a target term embedding representing the term of interest;
   determining a set of candidate word groups of the document corpus, wherein the set of candidate word groups corresponds to a subset of word groups of the document corpus that include the term of interest or a first term that is semantically similar to the term of interest based on distances between the target term embedding and term embeddings representing terms from the document corpus;
   determining a target context embedding representing a target word group, the target word group including the term of interest and context words located in the document proximate to the term of interest;
   identifying, from among the document corpus, a first candidate word group that is semantically similar to the target word group based on a distance between the target context embedding and a context embedding of the first candidate word group;
   identifying, from among the set of candidate word groups, a second candidate word group that is semantically dissimilar to the target word group based on a distance between the target context embedding and a context embedding of the second candidate word group;
   presenting, via a user interface, output including the first candidate word group and the second candidate word group;
   receiving user input via the user interface, the user input identifying at least a portion of the first candidate word group as associated with a first label and identifying at least a portion of the second candidate word group as not associated with the first label; and
   generating labeled training data based on the user input to train the text classifier.

2. The method of claim 1, wherein the input designating the term of interest includes user input selecting the term of interest in the document and associating the term of interest with the first label.

3. The method of claim 1, wherein the target word group corresponds to a single sentence in the document.

4. The method of claim 1, wherein the target word group includes a specified number of words around the term of interest in the document.

5. The method of claim 1, further comprising identifying as the first term a particular term that is represented by a term embedding that is within a threshold distance from the target term embedding.

6. The method of claim 1, wherein determining the target term embedding representing the term of interest includes looking up the target term embedding in embedding data associated with the document corpus.

7. The method of claim 1, wherein determining the target term embedding representing the term of interest includes providing data representing the term of interest as input to a trained term embedding network.

8. The method of claim 1, wherein determining the target context embedding representing the target word group includes looking up the target context embedding in embedding data associated with the document corpus.

9. The method of claim 1, wherein determining the target context embedding representing the target word group includes providing term embeddings representing the target word group as input to a trained context embedding network.

10. The method of claim 9, wherein the trained context embedding network includes a neural network with one or more long short term memory layers, and wherein the term embeddings are input to the neural network as an ordered sequence of input vectors, each input vector of the ordered sequence of input vectors representing a corresponding word of the target word group and an order of the ordered sequence of input vectors corresponding to an order of words in the target word group in the document.

11. The method of claim 1, wherein identifying the first candidate word group includes selecting, from the document corpus, a set of candidate word groups that are represented by context embeddings that are closest, among word groups in the document corpus, to the target context embedding, wherein the first candidate word group is one of the set of candidate word groups.

12. The method of claim 1, wherein identifying the second candidate word group includes
selecting, from the set of candidate word groups, a subset of candidate word groups that are represented by context embeddings that are farthest, among the set of candidate word groups, from the target context embedding, wherein the second candidate word group is one of the subset of candidate word groups.

13. The method of claim 1, further comprising training the text classifier using the labeled training data, wherein, during training of the text classifier, the first candidate word group is used as a positive example of the first label and the second candidate word group is used as a negative example of the first label.

14. The method of claim 1, wherein the output visually distinguishes the term of interest or a semantically similar term in the first candidate word group from other terms of the first candidate word group and visually distinguishes the term of interest or the first term in the second candidate word group from other terms of the second candidate word group.

15. The method of claim 1, wherein the term embeddings are generated independently of the document corpus.

16. A system for generating a text classifier for a document corpus, the system comprising:
one or more processors; and
one or more memory devices coupled to the one or more processors, the one or more memory devices storing instructions that are executable by the one or more processors to perform operations comprising:
receiving input designating a term of interest in a document of the document corpus;
determining a target term embedding representing the term of interest;
determining a set of candidate word groups of the document corpus, wherein the set of candidate word groups corresponds to a subset of word groups of the document corpus that include the term of interest or a term that is semantically similar to the term of interest based on distances between the target term embedding and term embeddings representing terms from the document corpus;
determining a target context embedding representing a target word group, the target word group including the term of interest and context words located in the document proximate to the term of interest;
identifying, from among the document corpus, a first candidate word group that is semantically similar to the target word group based on a distance between the target context embedding and a context embedding of the first candidate word group;
identifying, from among the set of candidate word groups, a second candidate word group that is semantically dissimilar to the target word group based on a distance between the target context embedding and a context embedding of the second candidate word group;
presenting, via a user interface, output including the first candidate word group and the second candidate word group;
receiving user input via the user interface, the user input identifying at least a portion of the first candidate word group as associated with a first label and
identifying at least a portion of the second candidate word group as not associated with the first label; and
generating labeled training data based on the user input to train the text classifier.

17. The system of claim 16, wherein the one or more memory devices further store embedding data associated with the document corpus and determining the target term embedding representing the term of interest includes looking up the target term embedding in the embedding data.

18. The system of claim 16, wherein the one or more memory devices further store a trained term embedding network and determining the target term embedding representing the term of interest includes providing data representing the term of interest as input to the trained term embedding network.

19. The system of claim 16, wherein the one or more memory devices further store embedding data associated with the document corpus and determining the target context embedding representing the target word group includes looking up the target context embedding in the embedding data.

20. The system of claim 16, wherein the one or more memory devices further store a trained context embedding network and determining the target context embedding representing the target word group includes providing term embeddings representing the target word group as input to the trained context embedding network.

21. The system of claim 20, wherein the trained context embedding network includes a neural network with one or more long short term memory layers, and wherein the term embeddings are input to the neural network as an ordered sequence of input vectors, each input vector of the ordered sequence of input vectors representing a corresponding word of the target word group and an order of the ordered sequence of input vectors corresponding to an order of words in the target word group in the document.

22. A computer-readable storage device storing instructions that are executable by a processor to perform operations including:
receiving input designating a term of interest in a document of a document corpus;
determining a target term embedding representing the term of interest;
determining a set of candidate word groups of the document corpus, wherein the set of candidate word groups corresponds to a subset of word groups of the document corpus that include the term of interest or a term that is semantically similar to the term of interest based on distances between the target term embedding and term embeddings representing terms from the document corpus;
determining a target context embedding representing a target word group, the target word group including the term of interest and context words located in the document proximate to the term of interest;
identifying, from among the document corpus, a first candidate word group that is semantically similar to the target word group based on a distance between the target context embedding and a context embedding of the first candidate word group;
identifying, from among the set of candidate word groups, a second candidate word group that is semantically dissimilar to the target word group based on a distance between the target context embedding and a context embedding of the second candidate word group;

presenting, via a user interface, output including the first candidate word group and the second candidate word group;

receiving user input via the user interface, the user input identifying at least a portion of the first candidate word group as associated with a first label and identifying at least a portion of the second candidate word group as not associated with the first label; and generating labeled training data based on the user input to train a text classifier.

23. The computer-readable storage device of claim 22, wherein the input designating the term of interest includes user input selecting the term of interest in the document and associating the term of interest with the first label.

24. The computer-readable storage device of claim 22, wherein the target word group corresponds to a single sentence in the document.

25. The computer-readable storage device of claim 22, wherein the target word group includes a specified number of words around the term of interest in the document.

26. The computer-readable storage device of claim 22, wherein determining the set of candidate word groups comprises comparing the target term embedding to the term embeddings representing the terms from the document corpus and identifying as a semantically similar term a particular term that is represented by a term embedding that is within a threshold distance from the target term embedding.

* * * * *